(12) United States Patent
Bailat et al.

(10) Patent No.: US 12,085,735 B2
(45) Date of Patent: Sep. 10, 2024

(54) BLACK-COLOURED ARTICLE

(71) Applicant: Nivarox-FAR S.A., Le Locle (CH)

(72) Inventors: Julien Bailat, Bienne (CH); Elisa Favre, Neuchatel (CH)

(73) Assignee: Nivarox-FAR S.A., Le Locle (CH)

( * ) Notice: Subject to any disclaimer, the term of this patent is extended or adjusted under 35 U.S.C. 154(b) by 532 days.

(21) Appl. No.: 17/432,703

(22) PCT Filed: Feb. 21, 2020

(86) PCT No.: PCT/EP2020/054590
§ 371 (c)(1),
(2) Date: Aug. 20, 2021

(87) PCT Pub. No.: WO2020/169786
PCT Pub. Date: Aug. 27, 2020

(65) Prior Publication Data
US 2022/0171103 A1      Jun. 2, 2022

(30) Foreign Application Priority Data

Feb. 21, 2019 (EP) .................................... 19158679

(51) Int. Cl.
*G02B 5/00*       (2006.01)
*C03C 17/36*     (2006.01)
(Continued)

(52) U.S. Cl.
CPC .......... *G02B 5/003* (2013.01); *C03C 17/3636* (2013.01); *C03C 17/3657* (2013.01); *C03C 17/3684* (2013.01); *G02B 5/0221* (2013.01); *G02B 5/0268* (2013.01); *G04B 19/12* (2013.01); *C03C 2217/211* (2013.01);
(Continued)

(58) Field of Classification Search
None
See application file for complete search history.

(56) References Cited

U.S. PATENT DOCUMENTS 4,997,538 A    3/1991   Luthier et al.
5,030,522 A    7/1991   Luthier et al.
(Continued)

FOREIGN PATENT DOCUMENTS

CN     1053137 A     7/1991
CN     1302090 A     7/2001
(Continued)

OTHER PUBLICATIONS

International Search Report issued on May 8, 2020 in PCT/EP2020/054590 filed on Feb. 21, 2020.
(Continued)

*Primary Examiner* — Derek S. Chapel
(74) *Attorney, Agent, or Firm* — Oblon, McClelland, Maier & Neustadt, L.L.P.

(57) ABSTRACT

A black-colored article which is not a photovoltaic device. The device includes a substantially transparent substrate; a substantially transparent textured layer provided upon a first surface of the substrate, the textured layer having a textured surface oriented away from the substrate; and an absorption layer including a silicon-germanium alloy, the absorption layer being situated upon the textured surface of the textured layer.

21 Claims, 5 Drawing Sheets

(51) Int. Cl.
*G02B 5/02* (2006.01)
*G04B 19/12* (2006.01)

(52) U.S. Cl.
CPC .. *C03C 2217/216* (2013.01); *C03C 2217/268* (2013.01); *C03C 2217/72* (2013.01); *C03C 2217/732* (2013.01); *C03C 2218/32* (2013.01)

(56) References Cited

U.S. PATENT DOCUMENTS

| | | | |
|---|---|---|---|
| 5,084,777 | A | 1/1992 | Slobodin |
| 6,498,380 | B1 * | 12/2002 | Otani .................. H01L 31/1884 |
| | | | 257/E31.13 |
| 8,187,481 | B1 | 5/2012 | Hobbs |
| 2014/0043615 | A1 | 2/2014 | Hagopian et al. |
| 2016/0064577 | A1 | 3/2016 | Ballif et al. |
| 2017/0123122 | A1 | 5/2017 | Ballif et al. |
| 2018/0011225 | A1 * | 1/2018 | Bellman .................. C23C 14/08 |
| 2018/0157214 | A1 | 6/2018 | Perret |

FOREIGN PATENT DOCUMENTS

| | | | |
|---|---|---|---|
| CN | 104423762 | A | 3/2015 |
| CN | 208343795 | U | 1/2019 |
| EP | 0 347 727 | A1 | 12/1989 |
| JP | 1-216319 | A | 8/1989 |
| JP | 10-153704 | A | 6/1998 |
| JP | 2009-141059 | A | 6/2009 |
| JP | 2014-111832 | A | 6/2014 |
| WO | WO 2016/104590 | A1 | 6/2016 |
| WO | WO 2018/013462 | A2 | 1/2018 |

OTHER PUBLICATIONS

Japanese Final Office Action issued May 9, 2023 on Japanese Patent Application No. 2021-549242 (with English Translation), citing reference 15 therein, 8 pages.

Combined Chinese Office Action and Search Report issued on May 25, 2022 in Chinese Patent Application No. 202080029794.8 (with English translation of office action only), citing references 1-3 and 15-17 therein, 13 pages.

Office Action issued Oct. 11, 2022, in corresponding Japanese Patent Application No. 2021-549242 (with English Translation), citing documents 15-18 therein, 6 pages.

Office Action issued Mar. 19, 2024, in corresponding Japanese Patent Application No. 2023-146811 (with English Translation), citing documents 15 therein, 9 pages.

* cited by examiner

BLACK-COLOURED ARTICLE

TECHNICAL FIELD

The present invention relates to the technical field of black-coloured articles such as timepiece components (particularly, but not limited to, watch dials), jewellery elements, stray light absorbing elements for optical instruments, and similar. More particularly, it relates to such an article which is easy to handle, robust, and cleanable.

STATE OF THE ART

Extremely deep black coloured articles are useful in many technological sectors, particularly in watchmaking and in optical instruments. In the former case, deeply matt black watch dials are highly desirable since they improve the readability of the time display by providing contrast with light-coloured hands or similar, and suppress reflections. This principle has been applied at least as far back as the 1930's, in the context of the Panerai Radiomir diving watch, which combined a matt black dial with luminous markings to maximise readability.

More recently, the document US2018/157214 discloses using carbon nanotubes as part of a black coating for a watch dial. Since carbon nanotubes absorb light extremely well, particularly when the light is travelling parallel to the axis of the nanotubes, such coatings can be more absorbent and less shiny than conventional coatings based on amorphous carbon (also known as lamp black or carbon black) either dispersed in a varnish or coated directly onto a substrate.

However, such carbon nanotube-based coatings are extremely fragile, and cannot be touched or cleaned without damaging the coating. As a result, this presents significant difficulties in manufacture and handling, since only the uncoated side of the dial can be handled. Any accidental contact with the nanotube-based coating risks damaging it to the degree that the dial is unusable and must be scrapped.

In the case of optical instruments such as light detectors, spectrometers, monochromators, microscopes, cameras, baffles for space instruments, etc . . . , such nanotube coatings can be applied internally to remove stray light that might negatively influence an optical measurement, and the same problems hence equally apply.

Existing alternative solutions which are physically more robust, such as the cathodically-sputtered coating described in U.S. Pat. No. 4,997,538, or black anodising of an aluminium substrate, are however optically inferior to coatings based on carbon nanotubes, and are hence unsuitable substitutes when a deep black colour is desired.

An aim of the present invention is hence to at least partially overcome the above-mentioned drawbacks of the prior art.

DISCLOSURE OF THE INVENTION

More specifically, the invention relates to a black-coloured article as defined in claim 1. This article, which is not a photovoltaic device (i.e. not a solar cell) comprises:
- a substantially transparent substrate, e.g. of glass, sapphire, alumina, polymer or similar;
- a substantially transparent textured layer provided directly or indirectly upon a first face of said substrate, said textured layer having a textured surface facing away from said substrate; and
- an absorption layer comprising silicon-germanium alloy situated directly or indirectly upon said textured surface of said textured layer, this absorption layer typically being undoped since it is not part of a photovoltaic device. Furthermore, the absorption layer is typically a homogeneous, unitary layer.

Silicon-germanium alloy, whether comprising hydrogen or not, strongly absorbs light in the visible range, particularly in the longer, red wavelength range, giving the article a deep black colour when viewed from the substrate side. Since the black colouration is provided by a layer situated on the side opposite from the viewing side, any slight damage on the free surface thereof caused by handling is invisible, and the surface of the substrate (or any further layer such as an anti-reflective and/or anti-scratch layer provided thereupon) is robust, resistant to damage and easily cleaned by conventional mechanical and/or chemical means. The textured surface of the textured layer works synergistically with the silicon-germanium layer by diffusing the incident light, thereby ensuring that more of it is absorbed by the Si—Ge layer to give an extremely deep black colour to the article.

Advantageously, said silicon-germanium alloy may comprise at least 2% germanium, preferably at least 10% germanium, further preferably at least 20% germanium further preferably substantially 30% germanium Advantageously, the article may further comprise an anti-reflective layer interposed between said substrate and said textured layer. This layer helps to reduce specular reflections, and hence enhances the blackness of the article. As an example, silicon oxynitride may be used for this layer, as can a multilayer with a graded index of refraction increasing through its thickness.

Advantageously, said anti-reflective layer may exhibit an index of refraction greater than the index of refraction of said substrate, thereby enhancing the suppression of specular reflections.

Advantageously, an anti-reflective coating may be provided upon a second face of said substrate, said second face being opposite to said first face and hence facing the intended viewing direction. This further reduces specular reflections.

Advantageously, said anti-reflective coating may exhibit an index of refraction lower than the index of refraction of said substrate, reducing specular reflections even more.

Advantageously, said textured layer may exhibit an index of refraction lower than the index of refraction of said absorption layer, again reducing specular reflections.

Advantageously, said silicon-germanium alloy layer may have a thickness between 400 and 700 nm, preferably between 550 and 675 nm, and/or said textured layer has a thickness of between 0.5 and 5 µm, preferably between 2.5 and 3 µm, and has a surface rms roughness on said textured surface of at least 10 nm rms (root mean square).

Advantageously, said textured layer may comprise zinc oxide and/or tin oxide. During deposition of such layers, the above-mentioned texture is automatically formed during deposition, without requiring any further steps.

The black-coloured article in question can for instance be a (non-photovoltaic) dial for a timepiece, another timepiece part such as a hand, gear, spring, bridge, a decorative element for a watchcase, crown, bezel or similar, a jewellery element provided on a necklace, collar, ring, bracelet, earring, pendant, brooch or similar, or a light absorbing element for an optical device such as a sensor, e.g. a light-trapping element, an optical baffle, a beam stopping surface or similar. Other applications include aesthetic cover glasses for phones, tablets, or electronic devices in general, or other decorative elements for home furniture, interior decoration, automobile decoration or similar.

The invention also relates to a method of manufacturing such a black-coloured article. This method comprises the steps of:
- providing a substantially transparent substrate;
- forming a substantially transparent textured layer directly or indirectly on a first surface of said substrate, said textured layer having a textured surface oriented away from said substrate;
- forming a layer comprising silicon-germanium alloy directly or indirectly upon said textured surface of said textured layer.

This results in the black-coloured article described above, with all the attendant advantages as previously disclosed. This layer may be entirely, or predominantly Si—Ge alloy, and may be hydrogenated and hence be a Si—Ge:H layer.

Advantageously, said substantially transparent textured layer may be formed of a material which automatically forms a surface texture during its deposition, such as chemical vapour deposited zinc oxide or tin oxide. As a result, since the texture is formed during the deposition step, no extra step of creating the texture is required.

Alternatively, the above-mentioned texture can be applied by mechanical texturing and/or chemical texturing (such as by means of a chemical etch), and/or ion etching and/or laser ablation. This texture can be stochastic or non-stochastic depending on the process used to generate it.

Advantageously, said substantially transparent substrate may comprise an antireflective layer already provided on a second surface thereof, for instance in the case in which an off-the-shelf glass or polymer substrate is used.

Advantageously, the method may further comprise a step of forming an anti-reflective layer on said first surface of said substrate prior to forming said textured layer.

Advantageously, the absorption layer is deposited as an undoped layer, and/or as a single, homogeneous layer.

BRIEF DESCRIPTION OF THE DRAWINGS

Further details of the invention will appear more clearly upon reading the description below, in connection with the following figures which illustrate.

EMBODIMENTS OF THE INVENTION

Figure 1:
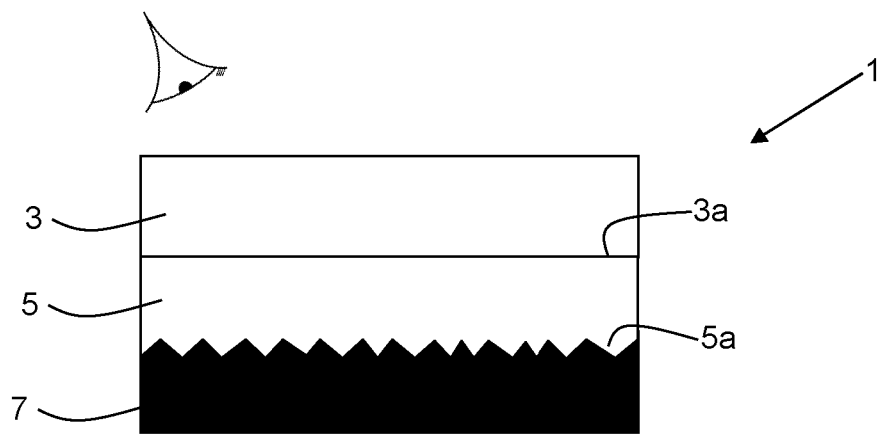
FIG. 1 is a schematic cross-sectional view of the simplest form of an article according to the invention.

FIG. 1 illustrates a schematic cross section of the simplest form of a black-coloured article 1 according to the invention. As mentioned above, this article 1 can be a watch dial, a jewellery element, a light absorbing element for an optical instrument, or any other article desired to be very light-absorbent. The article 1 is not a photovoltaic device, i.e. is not a solar cell. In other words, it is substantially photovoltaically inert, and is not adapted to produce or deliver an electric current when exposed to light. Article 1 comprises a substantially-transparent substrate 3 of any desired thickness, which may be made of glass, polymer, a transparent ceramic such as sapphire or alumina, a glass-ceramic or any other convenient material. In the present text, "substantially transparent" should be understood as exhibiting a transmissivity of at least 95% of visible light (350-750 nm wavelength), and all indexes of refraction mentioned are in respect of visible light wavelengths. Although the substrate 3, and the resulting article, are illustrated as being planar, they can also be curved or formed to any desired shape.

Upon a first surface 3a of the substrate 3, which faces away from an intended viewing direction (indicated schematically by means of the eye symbol representing the point of view of an observer), is provided a substantially transparent textured layer 5. This textured layer 5 may be directly situated upon said first face 3a as illustrated in FIG. 1, or may be indirectly situated thereupon, with one or more supplemental layers interposed between the substrate 3 and the textured layer 5, as will be discussed in more detail in the context of FIG. 2 below.

Textured layer 5 may be for instance a layer of zinc oxide formed upon the first surface 3a by means of chemical vapour deposition (CVD) or similar, which will cause the surface 5a of the textured layer 5 which faces away from the substrate 3a to exhibit a plurality of pyramidal forms, as represented schematically by means of an irregular zigzag line. Another particularly suitable material for this layer is CVD-deposited tin oxide, which is transparent and exhibits a more rounded surface morphology than the sharply-defined pyramidal forms of zinc oxide. Other substances exhibiting similar properties are also possible.

It is also possible to texture said surface 5a in a separate step after depositing a different material that does not inherently form a textured surface, such as a transparent polymer, alumina, or similar. This texturing can be carried out mechanically (e.g. by machining, grinding, abrasive brushes, sand or bead blasting, or similar), by means of ion etching, laser etching or ablation, or by chemical etching.

Alternatively, the surface 3a of the substrate may itself be textured; this texture being transferred to surface 5a of the textured layer 5 even if it is made of a material that does not inherently form a textured surface.

It is unimportant how the texture is formed, but ideally the texture should have a minimum rms value of 10 nm, and may be stochastic or non-stochastic. In particular, values of 15 nm to 500 nm rms are the most useful. RMS roughness is described in the standard ASME B46.1, and is hence well-known to the skilled person.

Irrespective of how the textured layer 5 is formed, its thickness is ideally between 0.5 and 5 μm thick, preferably between 2.5 and 3.0 μm thick.

Upon said surface 5a of the textured layer 5 is formed an absorption layer 7 of silicon-germanium alloy comprising at least 2% germanium, preferably at least 10% or 20% germanium, further preferably 20% to 40% germanium, further preferably substantially 30% germanium, the balance being substantially all silicon and hydrogen in the case in which the layer is hydrogenated (SiGe:H). This layer typically has a thickness of between 400 and 700 nm, more particularly between 550 and 675 nm, and is typically deposited directly upon the textured layer 5 although intervening layers are also possible.

Silicon-germanium alloy absorbs visible light wavelengths particularly strongly, and also has a high index of refraction of the order of 3-4, which is typically significantly in excess of the index of refraction of the textured layer 5. In the case of zinc oxide, this refractive index is around 2. As a result, visible light leaving the textured layer 5 at its textured surface 5a is recycled into the absorbing layer 7 by multiple reflections and thus resulting in the absorption a maximum of light.

As a result, it is possible to arrange the various layers such that the index of refraction increases from the substrate 3 (or from the anti-reflective coating 9, if present) to the Si—Ge layer 7, which minimises specular reflections.

It should be noted that in this construction, and in all the constructions disclosed herein, that absorbing layer 7 is the only layer present which is formed from a semiconductor material. Since the article 1 is not a photovoltaic device, i.e. is substantially photovoltaically inert, absorbing layer 7 is typically undoped (i.e. intrinsic-type), although it is not excluded that P-type or N-type dopants may be present. Furthermore, the article is free of any P-N, N-P, PIN, NIP or other type of photovoltaically-active junction formed by different dopings or similar. In essence, it is coincidental that the Si—Ge of layer 7 is a semiconductor, since it has been chosen for its light-absorbing properties. It should also be noted that layer 7 is typically a single, substantially homogeneous layer, and is not a layer stack or other more complicated arrangement, since this ensures that its deposition can be carried out rapidly and efficiently, in a single process step, leading to very economic production.

Figure 2:
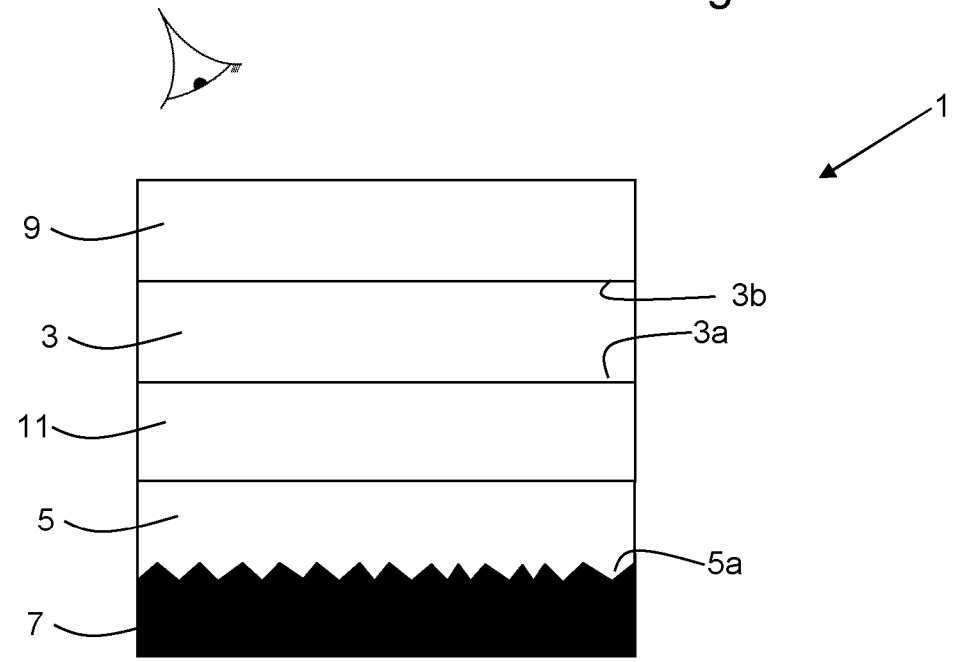
FIG. 2 is a schematic cross-sectional view of a further variant of an article according to the invention.

FIG. 2 illustrates a further variant of a black-coloured article 1, in which two further measures to improve the blackness have been implemented. However, it is entirely possible to apply one or other of them individually.

Layers 3, 5 and 7 are as described above, and need not be discussed again.

The first measure to further deepen the colour is the presence of an anti-reflective coating 9 comprising one or more layers applied on the surface of the substrate 3 facing towards the intended viewing direction, i.e. facing away from the Si—Ge alloy layer 7. This surface is defined as the "second surface" 3b.

This anti-reflective coating 9 may also have anti-scratch and anti-abrasion properties, such coatings being well-known in and of themselves, particularly in the field of eye glasses to reduce specular reflections and hence reduce shine. Examples thereof are disclosed in e.g. U.S. Pat. No. 9,726,786, WO2008112047, DE102015114877, U.S. Pat. No. 9,817,155 and innumerable other documents. Alternatively, an additional anti-scratch coating (not illustrated) may be provided upon the anti-reflective coating 9 if this latter has poor resistance to scratches etc.

In the context of the present invention, the anti-reflective coating advantageously has a refractive index lower than that of the substrate 3, which helps to reduce back-reflections and hence to deepen the colour.

The second measure to deepen the colour is a further anti-reflective layer 11, interposed between the substrate 3 and the textured layer 5. This layer typically has a refractive index with a value situated between that of the substrate 3 and the textured layer 5, and may for instance be a layer of silicon oxynitride with a thickness of between 10 and 200 nm, and more preferably between 70 and 90 nm. This layer may also be a multilayer exhibiting a graded index of refraction, increasing towards the Si—Ge layer 7.

Figure 3A:
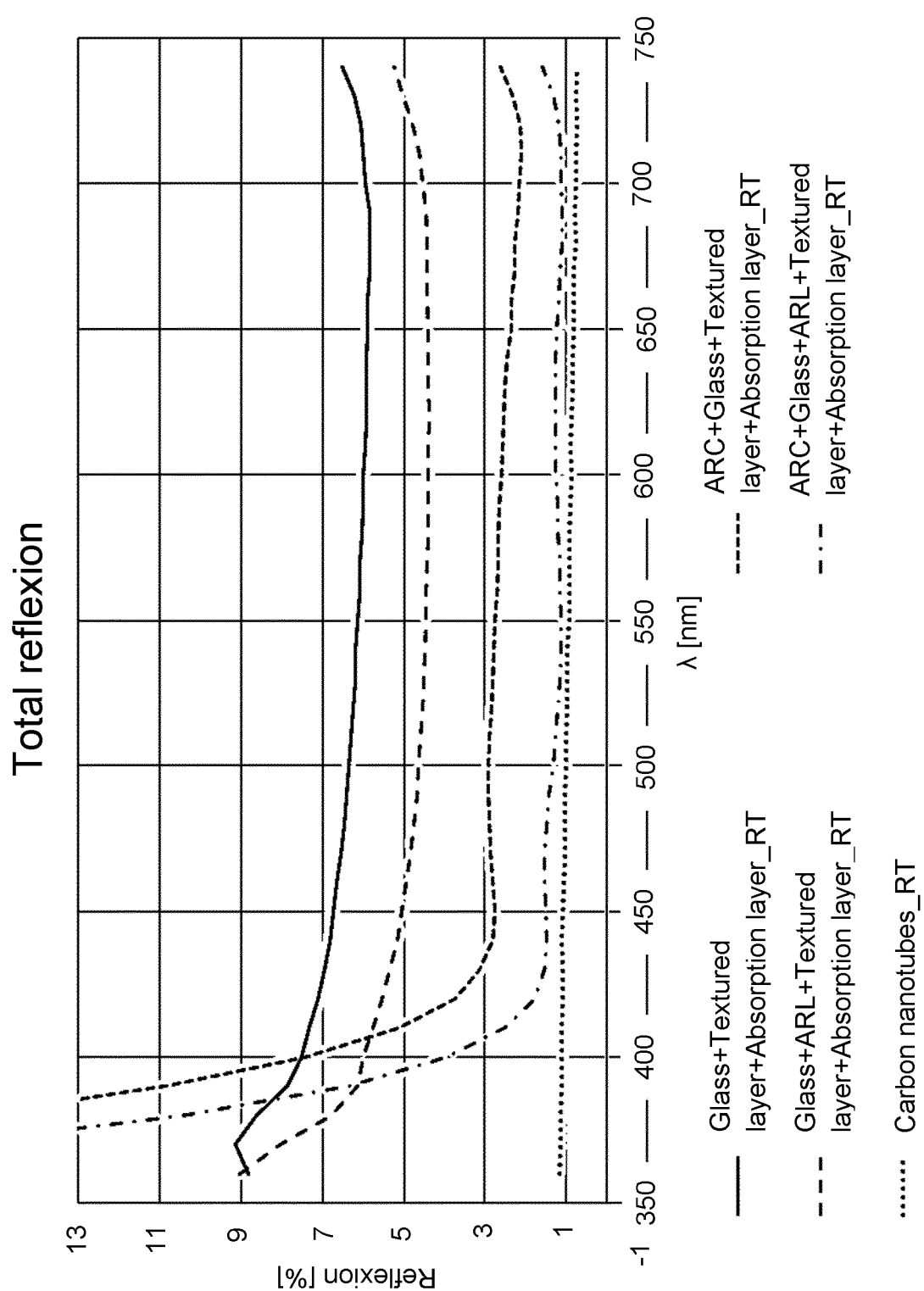
FIGS. 3a and 3b are graphs of total and diffuse reflection of various different samples of articles according to the invention.
Figure 3B:
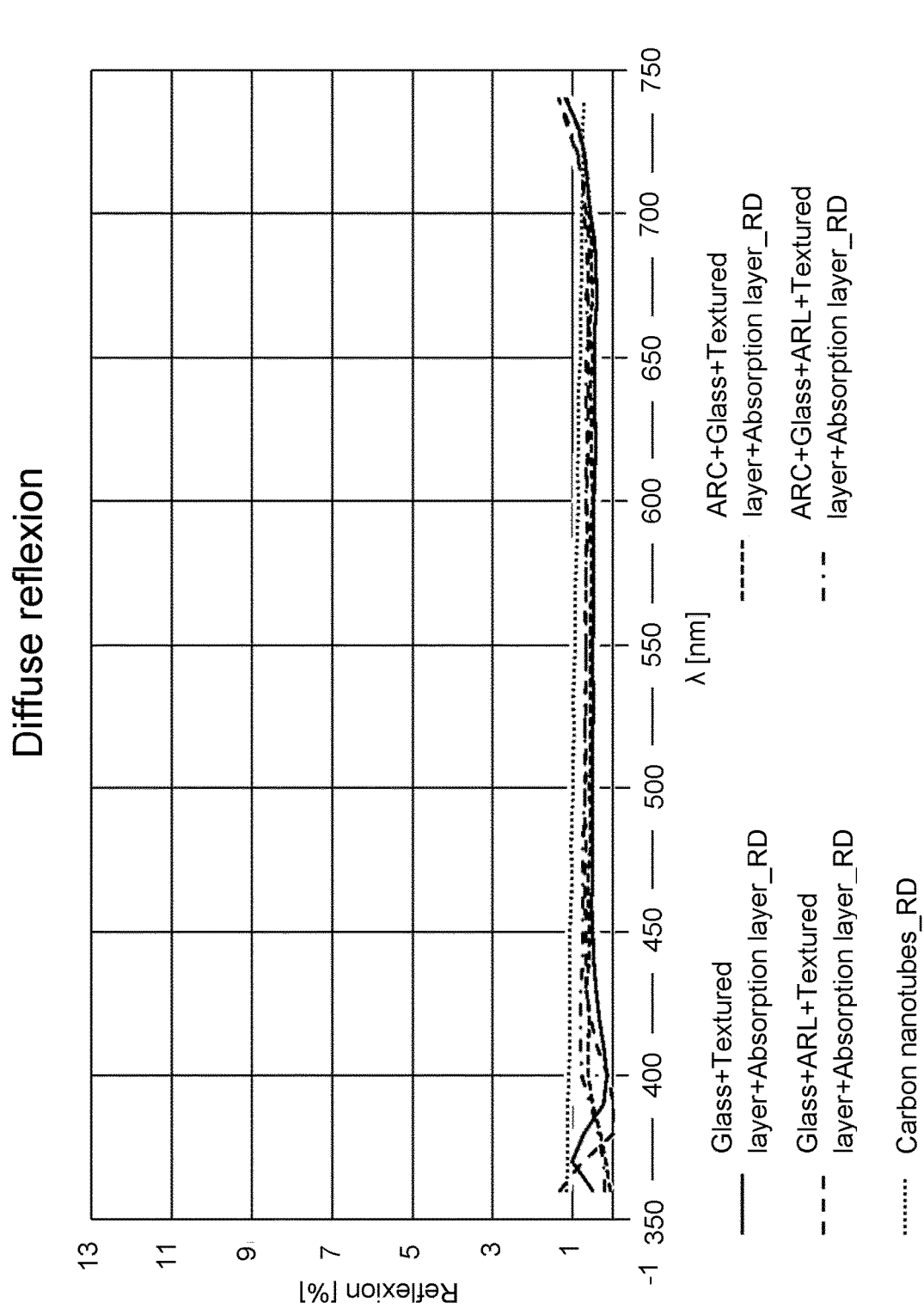

FIGS. 3a and 3b show a pair of graphs representing the effect of the invention, illustrating the percentage of reflected light for both total reflection and for diffuse reflection as a function of the wavelength of incident light, with five different samples. The average results for the 450-740 nm wavelength ranges for five different samples are as follows, listed from left to right, top to bottom of the legend of each graph of FIGS. 3a and 3b:

| Sample layers | Total reflection (%) (FIG. 3a) | Diffuse reflection (%) (FIG. 3b) |
|---|---|---|
| a) glass substrate 3; ZnO textured layer 5; Si—Ge absorption layer 7 | 6.50 | 0.50 |
| b) anti-reflective coating 9; glass substrate 3; ZnO textured layer 5; Si—Ge absorption layer 7 | 2.60 | 0.60 |
| c) glass substrate 3; anti-reflective layer 11; ZnO textured layer 5; Si—Ge absorption layer 7 | 4.75 | 0.65 |
| d) anti-reflective coating 9; glass substrate 3; anti-reflective layer 11; ZnO textured layer 5; Si—Ge absorption layer 7 | 1.30 | 0.70 |
| e) Carbon nanotubes | 1.0 | 1.0 |

In each case, the thickness of the anti-reflective coating 9 is approximately 70-90 nm; that of the glass substrate 3 is approximately 0.5 mm; that of the anti-reflective layer 11 is approximately 80 nm; that of the ZnO layer 5 is approximately 2.5 µm; and that of the SiGe absorption layer 7 is approximately 625 nm.

As can clearly be seen, the results are extremely similar for diffuse reflection, at well under 1% reflection, and both the anti-reflective coating 9 and anti-reflective layer 11 contribute to bring total reflection down to just over 1% when used in combination (sample e). This represents a very deep black colour.

Furthermore, measurements of colour of the four samples were taken, the colour parameters being measured in the L*a*b* system, which is perceptually uniform and correlates with the human eye perception. In this model, L* represents the luminance (from L*=0, black to L*=100, white), a* is the green-red scale (from a*=−128, green to a*=+127, red) and b* is the blue-yellow scale (from b*=−128, blue to b*=+127, yellow). Thus, a perfect black is defined by L*=a*=b*=0. The samples are measured simultaneously in SCI ("Specular Component Included") mode, where the specular component of the reflection is included (i.e. total reflection), and in SCE ("Specular Component Excluded") mode, where only the diffuse component of the reflection is included. In each case, a standard D65 illuminant was used, with a 10° observer.

The approximate results were as follows:

| Sample | L* (total reflection) | a* (total reflection) | b* (total reflection) | L* (diffuse reflection) | a* (diffuse reflection) | b* (diffuse reflection) |
|---|---|---|---|---|---|---|
| a | 30 | 0.0 | −2.4 | 4.2 | −0.6 | 0.0 |
| b | 19 | −0.6 | −2.0 | 5.0 | 0.0 | 0.0 |
| c | 26 | 0.6 | −2.8 | 6.0 | −0.5 | 0.0 |
| d | 11 | 1.7 | −3.9 | 6.2 | 0.0 | −1.2 |
| e | 8.6 | −0.6 | −1.7 | 8.6 | −0.6 | −1.7 |

As can be seen from these figures, the blackness of the samples is extremely deep, and that the anti-reflective coating 9 and layer 11 reduce the specular component of reflection without substantially changing the colour values. This result is all the more surprising due to the fact that the absorption layer 7 is situated away from the direction of incident light, whereas in conventional black-coloured articles, the black colour is provided on the surface facing the viewer as a lacquer or coating.

As a result, the absorption layer 7 is not situated on an observer-facing surface of the article 1 and is hence protected from damage in handling. Indeed, this layer 7 can even sustain superficial damage without this being visible to the user, since it is on a rear face thereof facing away from him. Since the substrate 3, and any coatings thereupon such as anti-reflective and/or anti-scratch coatings 9, are on the user-facing side of the article 1, they can be easily handled and cleaned with conventional mechanical and chemical products, without risking damaging the light-absorbing layer 7 or affecting the optical properties of the article. To maximise the cleanability (and resistance to scratches), the second surface 3b of the substrate 3 and/or the outermost surface of any coating 9 provided thereupon ideally exhibits a maximum surface roughness of 5 nm rms, more particularly 1 nm rms or less.

Figure 4:
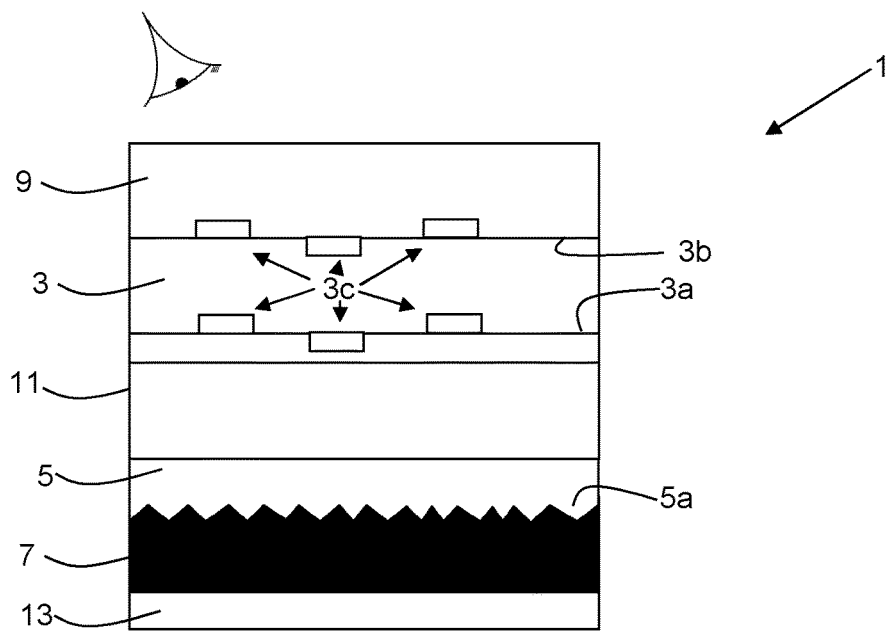
FIG. 4 is a schematic cross-sectional view of a yet further variant of an article according to the invention.

FIG. 4 illustrates an embodiment of an article 1 corresponding to that illustrated in FIG. 2, in which several further optional measures have been taken. These measures can be applied individually or in combination, and it is equally possible to leave out the anti-reflective coating 9 and/or the anti-reflective layer 11.

Firstly, the absorber layer 7 can be protected on the underside of the article 1 by means of further protective layer 13, e.g. of an encapsulant, deposited thereupon to protect it.

In addition, it is also possible to provide a deliberately-formed relief motif 3c, on one, other or both of the faces of the substrate. This motif may e.g. be a regular pattern, lettering, an image or similar, and may extend above the main surface of the substrate 3, or may be recessed into said surface, the height and/or depth of the relief being at least 1 μm above and/or below the main surface of the substrate 3 as appropriate.

Also, it should be noted that further layers can be incorporated as required, such as diffusion layers and similar. In the case in which such a layer is disposed between the textured layer 5 and the Si—Ge alloy layer 7, it should be noted that the texture will be transposed through this extra layer such that the surface of the Si—Ge alloy layer 7 facing towards the substrate 3 will still be textured.

Figure 5:
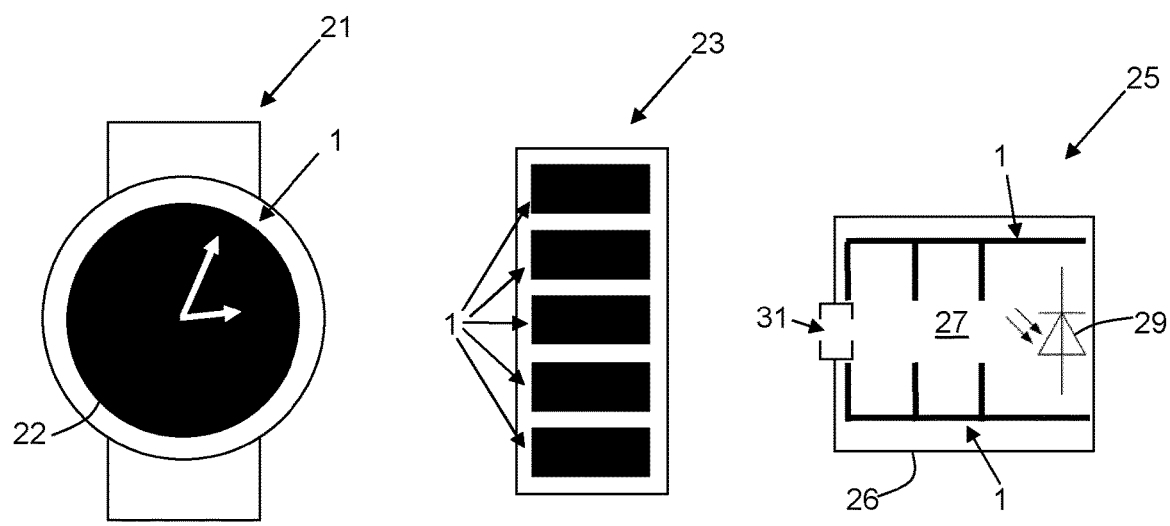
FIG. 5 is a schematic representation of three advantageous uses of an article according to the invention.

FIG. 5 represents schematically three potential non-limitative application of the article 1 according to the invention. On the left of this figure is represented a timepiece 21, in which the article 1 is used as a dial 22, the substrate 3 thereof facing towards the user when he reads the time.

In the middle of FIG. 5, the article 1 is incorporated as a decorative element into a piece of jewellery, such as a bracelet, pendant, brooch, earring or similar.

On the right of FIG. 5, the article 1 is incorporated into an optical sensor 25, comprising a housing 26 defining an enclosed space 27 containing a photosensor 29. This latter faces a shutter or opening 31, and the article 1 is arranged to absorb undesired light other than that passing directly from the shutter 31 to the sensor 29, the substrate 3 being arranged in each section of the article 1 facing the interior of the housing and/or towards the shutter 31.

Other applications are, of course, possible.

Figure 6:
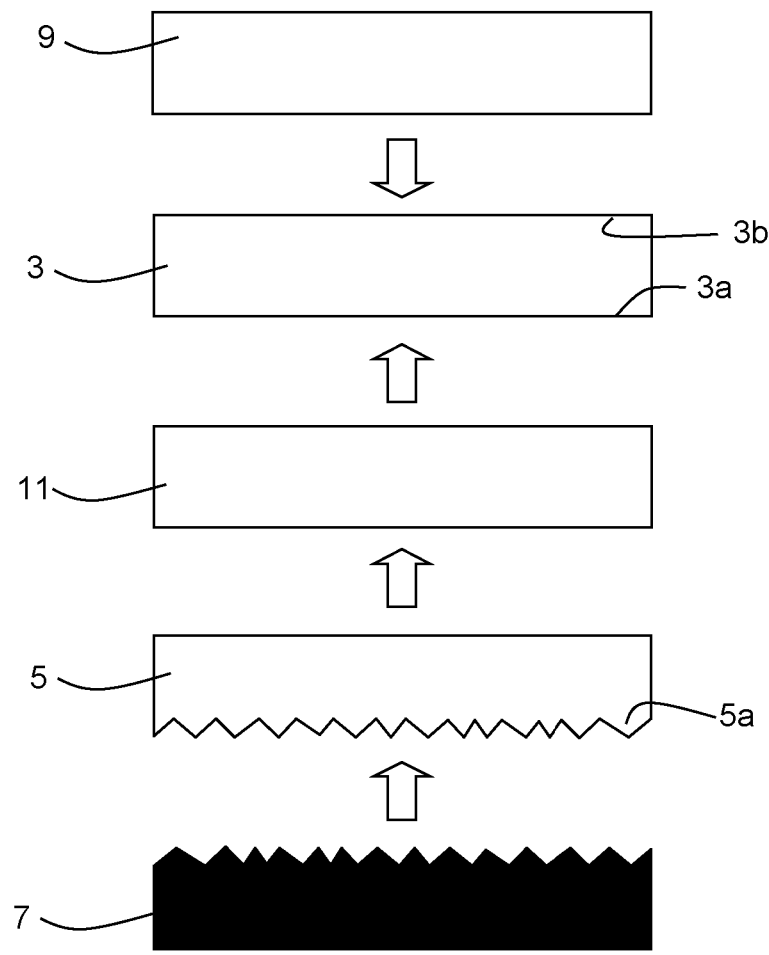
FIG. 6 is a schematic representation of a method of manufacturing an article according to the invention.

In terms of manufacturing steps, FIG. 6 illustrates schematically the manufacture of an article 1 corresponding to that of FIG. 2. In the case of an article 1 according to FIG. 1, or an article in which one or other of the anti-reflective coating 9 or the anti-reflective layer 11 is omitted, the corresponding method steps are simply omitted.

Firstly, the substrate 3 is provided, and serves as the basis upon which all other layers are formed. Since appropriate materials for the substrate 3 have been discussed in detail above, they will not be repeated here.

If present, the anti-reflective coating 9 is provided on the second surface 3b of the substrate 3, for instance as described in U.S. Pat. No. 9,726,786, WO2008112047, DE102015114877, U.S. Pat. No. 9,817,155 or in innumerable other documents, at any convenient moment in the method, and does not need to be the first layer deposited. However, since commercially-available glass and plastic substrates already provided with anti-reflective coatings are available off-the-shelf, it will often be the case that this layer is indeed deposited first, and will hence already be present on the substrate 3 when the other layers are deposited.

If present, the anti-reflective layer 11 is subsequently deposited on the first surface 3a of the substrate 3. As a non-limiting example, this may be a layer of silicon oxynitride, deposited by plasma-assisted chemical vapour deposition under the following conditions in a reactor with 13.56 MHz plasma excitation frequency, 15 mm inter-electrode distance, 45×55 cm electrode surface dimensions, to give the thickness indicated:

| Layer type | $[SiH_4]$ flow rate (sccm) | $[NH_3]$ flow rate (sccm) | $[CO_2]$ flow rate (sccm) | pressure (mbar) | Plasma power (W) | thickness (nm) |
|---|---|---|---|---|---|---|
| SiNxOy | 15-20 | 60-100 | 10-40 | 1.5 | 50 | 70-90 |

Subsequently, the textured layer 5 is deposited directly or indirectly upon said first surface 3a. In the case in which this layer is made of zinc oxide, it may be deposited by low-pressure chemical vapour deposition under the following conditions in the above-mentioned reactor, to give the thickness indicated:

| Layer type | $[H_2O]$ flow rate (sccm) | [Diethyl zinc] flow rate (sccm) | pressure (mbar) | T (° C.) | thickness (um) |
|---|---|---|---|---|---|
| ZnO | 255 | 160 | 0.5 | 190 | 1.5 to 5 |

In the case in which the textured layer 5 is made of a material which, unlike ZnO, does not have a suitable surface texture as a result of its deposition, it may be mechanically, chemically, optically or ionically structured as described above.

Subsequently, the absorption layer 7 of Si—Ge alloy is deposited directly or indirectly upon the free surface of the textured layer 5, for instance by plasma assisted chemical vapour deposition under the following conditions in the above-mentioned reactor, to give the thickness indicated:

| Layer type | $[SiH_4]$ flow rate (sccm) | $[GeH_4]$ flow rate (sccm) | $[H_2]$ flow rate (sccm) | Pressure (mbar) | Plasma power (W) | Thickness (nm) |
|---|---|---|---|---|---|---|
| (i) SiGe | 40 | 12 | 1300 | 3.3 | 110 | 625 ± 35 |

Other intermediate or exterior layers can of course be deposited as required.

Although the invention has been described with reference to specific embodiments, variations thereto are possible without departing from the scope of the invention as defined in the appended claims.

The invention claimed is:

1. A black-colored article, comprising:
   a substantially transparent substrate;
   a substantially transparent textured layer provided upon a first surface of said substrate, said textured layer having a textured surface oriented away from said substrate;
   an anti-reflective layer interposed between the substrate and the textured layer;
   an anti-reflective coating having an incident light surface and being provided upon a second surface of said substrate, the second surface being opposite to the first surface; and
   an absorption layer comprising silicon-germanium alloy, said absorption layer being situated upon said textured surface of said textured layer,
   wherein the article is not a photovoltaic device.

2. The black-colored article according to claim 1, wherein said silicon-germanium alloy comprises at least 2% germanium.

3. The black-colored article according to claim 1, wherein said anti-reflective layer exhibits an index of refraction greater than an index of refraction of said substrate.

4. The black-colored article according to claim 1, wherein said anti-reflective coating exhibits an index of refraction lower than an index of refraction of said substrate.

5. The black-colored article according to claim 1, wherein said textured layer exhibits an index of refraction lower than an index of refraction of said absorption layer.

6. The black-colored article according to claim 1, wherein said absorption layer has a thickness between 400 and 700 nm.

7. The black-colored article according to claim 1, wherein said textured layer has a thickness of between 0.5 and 5 µm, and has a surface rms roughness on said textured surface of at least 10 nm.

8. The black-colored article according to claim 7, wherein said textured layer comprises zinc oxide and/or tin oxide.

9. The black-colored article according to claim 1, wherein said article is one of:
   a dial for a timepiece,
   a timepiece hand, gear, spring, or bridge;
   a decorative element for a watchcase, watch crown, watch bezel, home furniture, interior decoration, or automobile decoration;
   a decorative element for a necklace, a collar, a ring, a bracelet, an earring, a pendant, or a brooch,
   a light absorbing element for an optical device such as a light-trapping element, an optical baffle, or a beam stopping surface; and
   a decorative cover glass for a phone, tablet, or other electronic device.

10. The black-colored article according to claim 1, wherein said absorption layer is substantially undoped.

11. The black-colored article according to claim 1, wherein said absorption layer is substantially homogeneous.

12. The black-colored article according to claim 1, wherein said silicon-germanium alloy comprises substantially 30% germanium.

13. The black-colored article according to claim 1, wherein said absorption layer has a thickness between 550 and 675 nm.

14. The black-colored article according to claim 1, wherein said textured layer has a thickness of between 2.5 and 3 µm, and has a surface rms roughness on said textured surface of at least 10 nm.

15. A method of manufacturing a black-colored article, comprising:
   providing a substantially transparent substrate;
   forming a substantially transparent textured layer on a first surface of said substrate, said textured layer having a textured surface oriented away from said substrate;
   forming an anti-reflective layer interposed between the substrate and the textured layer;
   forming an anti-reflective coating having an incident light surface and being provided upon a second surface of said substrate, the second surface being opposite to the first surface; and
   forming an absorption layer comprising silicon-germanium alloy upon said textured surface of said textured layer,
   wherein the article is not a photovoltaic device.

16. The method according to claim 15, wherein said substantially transparent textured layer is formed of a material which automatically develops a surface texture during its deposition.

17. The method according to claim 16, wherein said substantially transparent textured layer comprises zinc oxide or tin oxide deposited by chemical vapor deposition.

18. The method according to claim 15, wherein said substantially transparent textured layer comprises a texture applied by one or more of:
   mechanical texturing;
   chemical texturing;
   ion etching; and
   laser ablation.

19. The method according to claim 15, further comprising forming the anti-reflective layer on said first surface of said substrate prior to forming said textured layer.

20. The method according to claim 15, wherein said absorption layer is substantially undoped and/or is substantially homogeneous.

21. A black-colored article, comprising:
   a substantially transparent substrate;
   a substantially transparent textured layer provided upon a first surface of said substrate, said textured layer having a textured surface oriented away from said substrate; and
   an absorption layer comprising silicon-germanium alloy, said absorption layer being situated upon said textured surface of said textured layer,
   wherein said absorption layer has a thickness between 400 and 700 nm, and
   the article is not a photovoltaic device.

* * * * *